United States Patent
Kohgo et al.

(10) Patent No.: US 6,800,674 B2
(45) Date of Patent: Oct. 5, 2004

(54) ANTHRAQUINONE COMPOUND AND WATER-BASED INK-JET RECORDING INK CONTAINING THE COMPOUND

(75) Inventors: Osamu Kohgo, Chiba (JP); Yoriaki Matsuzaki, Chiba (JP); Tadashi Okuma, Chiba (JP); Ryu Oi, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 68 days.

(21) Appl. No.: 09/958,475

(22) PCT Filed: Feb. 5, 2001

(86) PCT No.: PCT/JP01/00795

§ 371 (c)(1),
(2), (4) Date: Oct. 10, 2001

(87) PCT Pub. No.: WO01/59019

PCT Pub. Date: Aug. 16, 2001

(65) Prior Publication Data
US 2003/0078318 A1 Apr. 24, 2003

(30) Foreign Application Priority Data
Feb. 10, 2000 (JP) .......................................... 2000-033319

(51) Int. Cl.$^7$ .............................. C09D 11/10; C08K 5/08
(52) U.S. Cl. ....................................... 523/160; 524/358
(58) Field of Search ................................. 523/160, 161; 106/31.27, 31.44; 524/347, 358

(56) References Cited

U.S. PATENT DOCUMENTS

| | | | |
|---|---|---|---|
| 4,485,043 A | | 11/1984 | Kniel |
| 4,495,083 A | | 1/1985 | Imazeki et al. |
| 5,837,754 A | | 11/1998 | Shimomura et al. |
| 6,117,224 A | * | 9/2000 | Siegel et al. ............. 106/31.43 |
| 6,344,497 B1 | * | 2/2002 | Meyrick et al. ............ 523/160 |
| 2002/0006479 A1 | * | 1/2002 | Sekine et al. ................ 428/1.1 |

FOREIGN PATENT DOCUMENTS

| | | |
|---|---|---|
| DE | 21 06 617 A | 8/1972 |
| DE | 196 22 485 A1 | 12/1997 |
| EP | 0 924 335 A | 6/1999 |
| FR | 1 477 434 A | 4/1967 |
| JP | 57-117581 | 7/1982 |
| JP | 58213050 | 12/1983 |
| JP | 6-148939 | 5/1994 |
| JP | 6-240194 | 8/1994 |
| JP | 8-253729 | 10/1996 |
| JP | 11-124526 | 5/1999 |
| JP | 2000-26774 | 1/2000 |
| JP | 2000-154331 | 6/2000 |
| JP | 2000-297234 | 10/2000 |
| JP | 06-340835 | 12/2000 |
| JP | 2001-106930 | * 4/2001 |

OTHER PUBLICATIONS

Machine Translation of JP 08253729 (1996).*
Machine Translation of JP 06240194 (1994).*
Leach, R.H. and Pierce, R.J.; The Printing Ink Manual (5$^{th}$ Edition), Blueprint, London, 1993 (pp. 209–210).*

* cited by examiner

Primary Examiner—Callie Shosho
(74) Attorney, Agent, or Firm—Burns, Doane, Swecker & Mathis, L.L.P.

(57) ABSTRACT

It is disclosed that in ink for ink jet recording, containing at least a water-insoluble coloring matter, water and a resin as main components to form an emulsion, anthraquinone compounds represented by at least the following the formula (1)

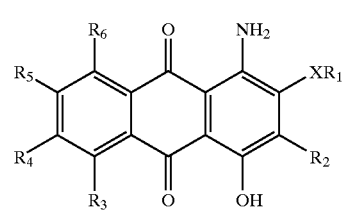

especially those in which X is an oxygen atom, $R_1$ is represented by the formula (2)

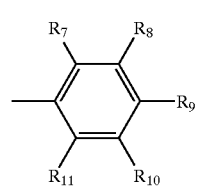

and further $R_8$ is $-NR_{12}R_{13}$, are useful as coloring matters excellent in water resistance and also in light fastness and compatibility with a resin and that ink for ink jet recording using the same and exhibiting excellent performances in light fastness and storage stability, especially as ink of an ink jet recording system, can form a high-quality, unblotted image, a recorded image having also excellent property in water resistance.

4 Claims, No Drawings

ANTHRAQUINONE COMPOUND AND WATER-BASED INK-JET RECORDING INK CONTAINING THE COMPOUND

TECHNICAL FIELD

The present invention relates to ink for ink jet recording which is appropriately used in an ink jet recording system. More specifically, it relates to anthraquinone compounds useful as magenta coloring matters of aqueous ink for ink jet recording, and aqueous ink for ink jet recording using the same.

BACKGROUND OF THE INVENTION

As ink for recording of an ink jet recording system, aqueous ink has been ordinarily used. Aqueous ink is basically made of a coloring matter, water and an organic solvent. In consideration of an odor and safety to the human body and the surrounding environment, it is ink-containing water as a main solvent.

Further, as a coloring matter, water-soluble dyes such as acid dyes, basic dyes, reactive dyes, direct dyes and the like are generally used.

With respect to ink for ink jet recording and a coloring matter, the following various characteristics are required. That is, (1) physical properties such as viscosity, surface tension, specific conductivity, density, pH and the like of ink are appropriate,
(2) long-term storage stability of ink is good,
(3) dissolution stability of a soluble component is high and clogging of a nozzle does not occur,
(4) quick-drying property of a recording medium is good, and
(5) a recorded image is sharp, and light fastness and water resistance are good. However, all these characteristics have not been satisfied at present.

Especially, in aqueous ink ordinarily used, a water-soluble dye is employed. Accordingly, there is such a serious problem in water resistance that when water is splashed on a recorded image, a dye is eluted to blot or lose a recorded image. Therefore, various studies have been currently made upon focussing on the improvement of water resistance.

For example, ink using a pigment or an oil-soluble dye as a coloring matter, a method in which an organic solvent, a resin or the like is added to aqueous ink using a water-soluble dye and the like have been studied. However, the use of a pigment was problematic in that dispersion stability was poor; storage stability was bad, clogging of a nozzle occurred, and so forth. Since an organic solvent was employed in case of using an oil-soluble dye, it posed problems in environmental sanitation, such as an odor and the like, or it was problematic in that ink blotting was heavy to invite the decrease in an image quality and so forth.

Moreover, even ink-containing additives involved problems that storage stability was poor, clogging of a nozzle occurred, ink was increased in viscosity to decrease jetting of ink and so forth.

Recently, ink using an aqueous dispersion in which a polyester resin colored with a dye or a pigment is used as a dispersoid is described in Japanese Patent Laid-Open No. 340,835/1994 or the like. Nevertheless, a pigment still involves the foregoing problems. A dye has also still problems that since it has poor compatibility with a resin, a precipitate appears in ink to decrease storage stability, to invite clogging of a nozzle and so forth.

As stated above, characteristics of ink used in an ink jet recording system in particular are greatly influenced by characteristics inherent in a coloring matter. It is thus quite important to produce a coloring matter that satisfies the foregoing required characteristics.

DISCLOSURE OF THE INVENTION

The invention aims to provide a coloring matter which is high in solubility in an organic solvent, excellent in water resistance and further excellent in light fastness and compatibility with a resin, and aqueous ink for ink jet recording of a magenta color type using the same, which aqueous ink is excellent in water resistance, light fastness and storage stability and most suitable for an ink jet recording system.

The present inventors have assiduously conducted investigations to solve the foregoing problems, and have consequently found that compounds represented by the formula (1) are coloring matters to meet the foregoing aim. This finding has led to the completion of the invention.

That is, the invention is as follows.

(1) Aqueous ink for ink jet recording which contains at least a water-insoluble coloring matter, water and a resin as main components to form an emulsion, characterized by containing at least one magenta coloring matter selected from anthraquinone compounds represented by the formula (1)

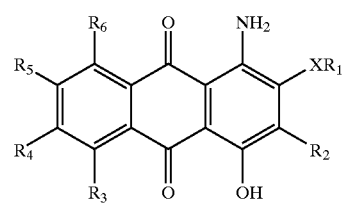

[wherein $R_1$ represents an optionally substituted alkyl group, an optionally substituted aryl group, an optionally substituted aralkyl group or an alkoxycarbonylalkyl group, X represents an oxygen atom or a sulfur atom, $R_2$ to $R_6$, independently from each other, represent a hydrogen atom, an optionally substituted alkyl group or an optionally substituted alkoxy group].

(2) The aqueous ink for ink jet recording recited in (1), wherein in the formula (1) recited in (1). $R_1$ is an optionally substituted aryl group represented by the formula (2)

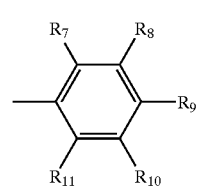

[wherein $R_7$ to $R_{11}$, independently from each other, represent a hydrogen atom, an optionally substituted alkyl group, an acyl group, $-NR_{12}R_{13}$ (in which $R_{12}$ and $R_{13}$, independently from each other, represent a hydrogen atom, an optionally substituted alkyl group or an acyl group) or $-YR_{14}$ (in which $R_{14}$ represents a hydrogen atom, an optionally substituted alkyl group, an acyl group or an alkoxycarbonylalkyl group, and Y represents an oxygen atom or a sulfur atom)], and X is an oxygen atom.

(3) The aqueous ink for ink jet recording recited in (2), wherein at least one of $R_7$ to $R_{11}$ in the formula (2) is $-NR_{12}R_{13}$.

(4) The aqueous ink for ink Jet recording recited in (3), wherein $R_{12}$ and $R_{13}$ in (3) are hydrogen atoms or optionally substituted alkyl groups.

(5) The aqueous ink for ink jet recording recited in (4), wherein $R_8$ in the formula (2) is $-NR_{12}R_{13}$, and $R_{12}$ and $R_{13}$ are both alkyl groups having the total carbon number of 4 or more.

(6) Resin fine particles colored with at least one magenta coloring matter selected from anthraquinone compounds represented by the formula (1)

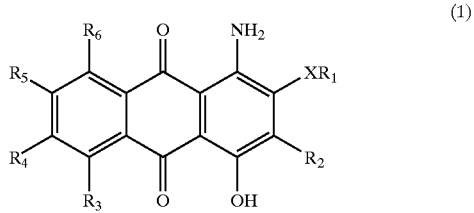

[wherein $R_1$ represents an optionally substituted alkyl group, an optionally substituted aryl group, an optionally substituted aralkyl group or an alkoxycarbonylalkyl group, X represents an oxygen atom or a sulfur atom, $R_2$ to $R_6$, independently from each other, represent a hydrogen atom, an optionally substituted alkyl group or an optionally substituted alkoxy group].

(7) A dispersion formed by dispersing the colored resin fine particles recited in (6) in an aqueous medium.

(8) Anthraquinone compounds represented by the formula (1)

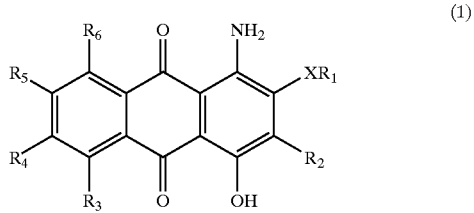

[wherein $R_1$ represents an optionally substituted alkyl group, an optionally substituted aryl group, an optionally substituted aralkyl group or an alkoxycarbonylalkyl group, X represents an oxygen atom or a sulfur atom, and $R_2$ to $R_6$, independently from each other, represent a hydrogen atom, an optionally substituted alkyl group or an optionally substituted alkoxy group].

(9) The anthraquinone compounds recited in (8), wherein in the formula (1) recited in (8), $R_1$ is an optionally substituted aryl group represented by the formula (2)

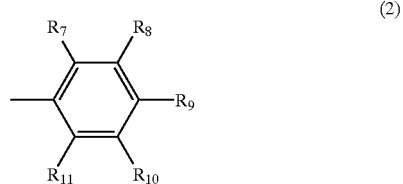

[wherein $R_7$ to $R_{11}$, independently from each other, represent a hydrogen atom, an optionally substituted alkyl group, an acyl group, $-NR_{12}R_{13}$ (in which $R_{12}$ and $R_{13}$, independently from each other, represent a hydrogen atom, an optionally substituted alkyl group or an acyl group) or $-YR_{14}$ (in which $R_{14}$ represents a hydrogen atom, an optionally substituted alkyl group, an acyl group or an alkoxycarbonylalkyl group, and Y represents an oxygen atom or a sulfur atom)], and X is an oxygen atom.

(10) The anthraquinone compounds recited in (9), wherein at least one of $R_7$ to $R_{11}$ in the formula (2) is $-NR_{12}R_{13}$.

(11) The anthraquinone compounds recited in (10), wherein $R_{12}$ and $R_{13}$ in (10) are hydrogen atoms or optionally substituted alkyl groups.

(12) The anthraquinone compounds recited in (11), wherein $R_8$ in the formula (2) is $-NR_{12}R_{13}$, and $R_{12}$ and $R_{13}$ are both alkyl groups having the total carbon number of 4 or more.

BEST MODE FOR CARRYING OUT THE INVENTION

The invention is aqueous ink for ink jet recording which contains at least a water-insoluble coloring matter, water and a resin as main components to form an emulsion, (1) the water-insoluble coloring matter being at least one magenta coloring matter selected from the anthraquinone compounds represented by the foregoing the formula (1), (2) which is resin fine particles colored with at least one coloring matter selected from the compounds represented by the formula (1), (3) which is a dispersion formed by dispersing the resin fine particles in an aqueous medium, and further (4) which is an emulsion formed by emulsifying and dispersing the resin fine particles.

The coloring matter according to the invention, namely, a coloring matter preferably used in aqueous ink for ink jet recording in the invention is a magenta coloring matter [hereinafter also referred to as a coloring matter for ink jet recording] selected from the anthraquinone compounds represented by the formula (1).

In the anthraquinone compounds represented by the formula (1), $R_1$ represents an optionally substituted alkyl group, an optionally substituted aryl group, an optionally substituted aralkyl group or an alkoxycarbonylalkyl group, X represents an oxygen atom or a sulfur atom, $R_2$ to $R_6$, independently from each other, represent a hydrogen atom, an optionally substituted alkyl group or an optionally substituted alkoxy group.

In the formula (2) in which $R_1$ is an optionally substituted aryl group, $R_7$ to $R_{11}$, independently from each other, represent a hydrogen atom, an optionally substituted alkyl group, an acyl group, $-NR_{12}R_{13}$ (in which $R_{12}$ and $R_{13}$, independently from each other, represent a hydrogen atom, an optionally substituted alkyl group or an acyl group) or $-YR_{14}$ (in which $R_{14}$ represents a hydrogen atom, an optionally substituted alkyl group, an acyl group or an alkoxycarbonylalkyl group).

In $R_1$ to $R_{14}$ in the formulas (1) and (2), the optionally substituted alkyl group indicates an unsubstituted alkyl group or a substituted alkyl group.

The unsubstituted alkyl group is a linear, branched or cyclic alkyl group having 1 or more, preferably 1 to 20 carbon atoms. Specific examples thereof include a methyl group, an ethyl group, an n-propyl group, an isopropyl group, an n-butyl group, an isobutyl group, a tert-butyl group, a sec-butyl group, an n-pentyl group, an isopentyl group, a tert-pentyl group, a sec-pentyl group, a cyclopentyl group, an n-hexyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,3-dimethylbutyl group, a 1,1,2-trimethylpropyl group, a 1,2,2-trimethylpropyl group, a 1-ethylbutyl group, a 2-ethylbutyl group, a 1-ethyl-2-methylpropyl group, a cyclohexyl group, a methylcyclopentyl group, an n-heptyl group, a 1-methylhexyl group, a 2-methylhexyl group, a 3-methylhexyl group, a 4-methylhexyl group, a 5-methylhexyl group, a 1,1-dimethylpentyl group, a 1,2-dimethylpentyl group, a 1,3-dimethylpentyl group, a 1,4-dimethylpentyl group, a 2,2-dimethylpentyl group, a 2,3-dimethylpentyl group, a 2,4-dimethylpentyl group, a 3,3-dimethylpentyl group, a 3,4-dimethylpentyl group, a 1-ethylpentyl group, a 2-ethylpentyl group, a 3-ethylpentyl group, a 1,1,2-trimethylbutyl group, a 1,1,3-trimethylbutyl group, a 1,2,3-trimethylbutyl group, a 1,2,2-trimethylbutyl group, a 1,3,3-trimethylbutyl group, a 2,3,3-trimethylbutyl group, a 1,1,3,3-tetramethylbutyl group, a 1-ethyl-1-methylbutyl group, a 1-ethyl-2-methylbutyl group, a 1-ethyl-3-methylbutyl group, a 2-ethyl-1-methylbutyl group, a 2-ethyl-3-methylbutyl group, a 1-n-propylbutyl group, a 1-isopropylbutyl group, a 1-isopropyl-2-methylpropyl group, a methylcyclohexyl group, an n-octyl group, a 1-methylheptyl group, a 2-methylheptyl group, a 3-methylheptyl group, a 4-methylheptyl group, a 5-methylheptyl group, a 6-methylheptyl group, a 1,1-dimethylhexyl group, a 1,2-dimethylhexyl group, a 1,3-dimethylhexyl group, a 1,4-dimethylhexyl group, a 1,5-dimethylhexyl group, a 2,2-dimethylhexyl group, a 2,3-dimethylhexyl group, a 2,4-dimethylhexyl group, a 2,5-dimethylhexyl group, a 3,3-dimethylhexyl group, a 3,4-dimethylhexyl group, a 3,5-dimethylhexyl group, a 4,4-dimethylhexyl group, a 4,5-dimethylhexyl group, a 1-ethylhexyl group, a 2-ethylhexyl group, a 3-ethylhexyl group, a 4-ethylhexyl group, a 1-n-propylpentyl group, a 2-n-propylpentyl group, a 1-isopropylpentyl group, a 2-isopropylpentyl group, a 1-ethyl-1-methylpentyl group, a 1-ethyl-2-methylpentyl group, a 1-ethyl-3-methylpentyl group, a 1-ethyl-4-methylpentyl group, a 2-ethyl-1-methylpentyl group, a 2-ethyl-2-methylpentyl group, a 2-ethyl-3-methylpentyl group, a 2-ethyl-4-methylpentyl group, a 3-ethyl-1-methylpentyl group, a 3-ethyl-2-methylpentyl group, a 3-ethyl-3-methylpentyl group, a 3-ethyl-4-methylpentyl group, a 1,1,2-trimethylpentyl group, a 1,1,3-trimethylpentyl group, a 1,1,4-trimethylpentyl group, a 1,2,2-trimethylpentyl group, a 1,2,3-trimethylpentyl group, a 1,2,4-trimethylpentyl group, a 1,3,4-trimethylpentyl group, a 2,2,3-trimethylpentyl group, a 2,2,4-trimethylpentyl group, a 2,3,4-trimethylpentyl group, a 1,3,3-trimethylpentyl group, a 2,3,3-trimethylpentyl group, a 3,3,4-trimethylpentyl group, a 1,4,4-trimethylpentyl group, a 2,4,4-trimethylpentyl group, a 3,4,4-trimethylpentyl group, a 1-n-butylbutyl group, a 1-isobutylbutyl group, a 1-sec-butylbutyl group, a 1-tert-butylbutyl group, a 2-tert-butylbutyl group, a 1-n-propyl-1-methylbutyl group, a 1-n-propyl-2-methylbutyl group, a 1-n-propyl-3-methylbutyl group, a 1-isopropyl-1-methylbutyl group, a 1-isopropyl-2-methylbutyl group, a 1-isopropyl-3-methylbutyl group, a 1,1-diethylbutyl group, a 1,2-diethylbutyl group, a 1-ethyl-1,2-dimethylbutyl group, a 1-ethyl-1,3-dimethylbutyl group, a 1-ethyl-2,3-dimethylbutyl group, a 2-ethyl-1,1-dimethylbutyl group, a 2-ethyl-1,2-dimethylbutyl group, a 2-ethyl-1,3-dimethylbutyl group, a 2-ethyl-2,3-dimethylbutyl group, a 1,2-dimethylcyclohexyl group, a 1,3-dimethylcyclohexyl group, a 1,4-dimethylcyclohexyl group, an ethylcyclohexyl group, an n-nonyl group, a 3,5,5-trimethylhexyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, an n-icosyl group and the like.

Examples of the substituted alkyl group include.
  halogen atom-substituted linear, branched or cyclic halogenated alkyl groups such as a fluoromethyl group, a difluoromethyl group, a trifluoromethyl group, a chloromethyl group, a dichloromethyl group, a trichloromethyl group, a bromomethyl group, a dibromomethyl group, a tribromomethyl group, a fluoroethyl group, a chloroethyl group, a bromoethyl group, a trifluoroethyl group, a pentafluoroethyl group, a tetrachloroethyl group, a hexafluoroisopropyl group and the like,
  alkoxy group-substituted linear, branched or cyclic alkoxyalkyl groups such as a methoxymethyl group, an ethoxymethyl group, a propoxymethyl group, a butoxymethyl group, a pentoxymethyl group, a hexyloxymethyl group, a cyclohexyloxymethyl group, a methoxyethyl group, an ethoxyethyl group, a propoxyethyl group, a butoxyethyl group, a pentoxyethyl group, a hexyloxyethyl group, a cyclohexyloxyethyl group, a methoxyethoxyethyl group, a methoxypropyl group, an ethoxypropyl group, a propoxypropyl group, a butoxypropyl group, a pentoxypropyl group, a hexyloxypropyl group, a cyclohexyloxypropyl group, a methoxyethoxypropyl group, a methoxypropyl group and the like,
  hydroxy group-substituted linear, branched or cyclic hydroxyalkyl groups such as a hydroxymethyl group, a hydroxyethyl group, a hydroxypropyl group, a hydroxymethylpropyl group, a hydroxycyclohexyl group and the like,
  linear, branched or cyclic alkylthio group-substituted alkyl groups such as a methylthiomethyl group, an ethylthiomethyl group, a propylthiomethyl group, a butylthiomethyl group, a pentylthiomethyl group, a hexylthiomethyl group, a cyclohexylthiomethyl group, a methylthioethyl group, an ethylthioethyl group, a propylthioethyl group, a butylthioethyl group, a pentylthioethyl group, a hexylthioethyl group, a cyclohexylthioethyl group, a methoxyethylthioethyl group, a methylthiopropyl group, an ethylthiopropyl group, a propylthiopropyl group, a butylthiopropyl group, a pentylthiopropyl group, a hexylthiopropyl group, a cyclohexylthiopropyl group, a methoxyethylthiopropyl group and the like, and
  linear, branched or cyclic alkylamino group- or dialkylamino group-substituted alkyl groups having at least 2 carbon atoms, preferably 2 to 9 carbon atoms, such as an N-methylaminomethyl group, an N,N-dimethylaminomethyl group, an N-ethylaminomethyl group, an N,N-diethylaminomethyl group, an N-propylaminomethyl group, an N,N-dipropylaminomethyl group, an N-methyl-N-ethylaminomethyl group, an N-methylaminoethyl group, an N,N-dimethylaminoethyl group, an N-ethylaminoethyl group, an N,N-diethylaminoethyl group, an N-propylaminoethyl group, an N,N-dipropylaminoethyl group, an N-methyl-N-ethylaminoethyl group, an N-methylaminopropyl group, an N,N-dimethylaminopropyl group, an N-ethylaminopropyl group, an N,N-diethylaminopropyl group, an N-propylaminopropyl group, an N,N-dipropylaminopropyl group, an N-ethyl-N-butylaminopropyl group and the like.

The optionally substituted alkoxy group refers to an alkoxy group in which an alkyl group is the optionally substituted alkyl group shown above, examples thereof being a methoxy group, an ethoxy group, a propoxy group, a butoxy group, a pentoxy group, a hexyloxy group, a cyclohexyloxy group and the like.

The optionally substituted aryl group indicates an aryl group such as an unsubstituted phenyl group, an unsubstituted naphthyl group, an unsubstituted anthraquinone group, or a phenyl group, a naphthyl group or an anthraquinone group substituted with at least one substituent selected from the optionally substituted alkyl group, the optionally substituted alkoxy group and the optionally substituted alkylamino group shown above.

The optionally substituted alkylamino group herein indicates an alkylamino group in which one or two of the two hydrogen atoms of the amino group are substituted with the optionally substituted alkyl groups shown above, examples thereof being an N-methylamino group, an N,N-dimethylamino group, an N-ethylamino group, an N,N-diethylamino group, an N-n-propylamino group, an N,N-di-n-propylamino group, an N-methyl-N-ethylamino group, an N,N-di-n-butylamino group, an N-n-butyl-N-methylamino group, an N,N-di-n-hexylamino group, an N,N-di-2-ethylhexylamino group and the like.

The optionally substituted aralkyl group refers to an aralkyl group in which a hydrogen atom of an alkyl group may be substituted with the optionally substituted aryl group shown above, examples thereof being a benzyl group, a phenetyl group, a methylbenzyl group, a naphthylethyl group, an anthraquinoylethyl group and the like.

Further, in the compounds of the invention, a dimerized form like a compound as coloring matter No 31 to be described later is mentioned as an example in which $R_1$ is an optionally substituted anthraquinone group.

The alkoxycarbonylalkyl group refers to an alkyl group of which the hydrogen atom is substituted with an alkoxycarbonyl group (the alkyl group here referred to indicates the foregoing optionally substituted alkyl group and the alkoxy indicates the foregoing optionally substituted alkoxy group). Examples thereof include a methoxycarbonylethyl group, a 2-ethylhexyloxycarbonylmethyl group, a 2-ethylhexyloxycarbonylethyl group and the like.

The acyl group refers to a group in which the foregoing optionally substituted alkyl group is bound to a carbonyl group, examples thereof being a formyl group, an acetyl group, a propionyl group, an isovaleryl group and the like.

Especially, the anthraquinone compounds preferably used in the aqueous ink for ink jet recording in the invention are compounds of the formula (1) in which X is an oxygen atom and $R_1$ is represented by the following formula (2).

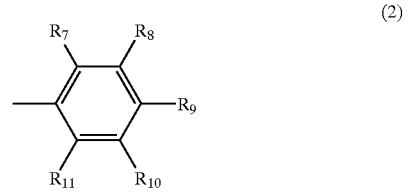

(2)

More preferable are, among the preferable examples, compounds in which at least one of $R_7$ to $R_{11}$ is —$NR_{12}R_{13}$ (in which $R_{12}$ and $R_{13}$, independently from each other, represent a hydrogen atom, an optionally substituted alkyl group or an acyl group). Further preferable are, among the more preferable examples, compounds in which $R_{12}$ and $R_{13}$ are hydrogen atoms or optionally substituted alkyl groups. Especially preferable are, among the further preferable examples, compounds in which $R_8$ in the formula (2) is —$NR_{12}R_{13}$ and $R_{12}$ and $R_{13}$ are both alkyl groups having the total carbon number of 4 or more.

Specific examples of the anthraquinone compounds represented by the formula (1) are shown in Table 1. However, the anthraquinone compounds of the invention are not limited to compounds in the Table.

TABLE 1

| No. | Structure formula |
|---|---|
| 1 | (structure) |
| 2 | (structure) |

TABLE 1-continued
| No. | Structure formula |
|---|---|
| 3 | 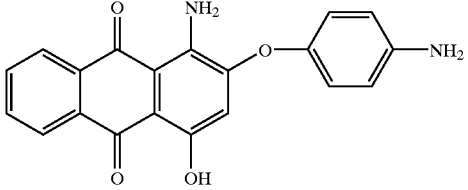 |
| 4 | 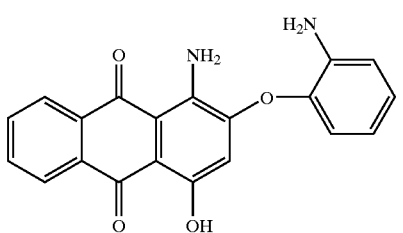 |
| 5 | 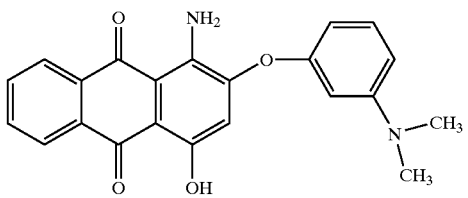 |
| 6 | 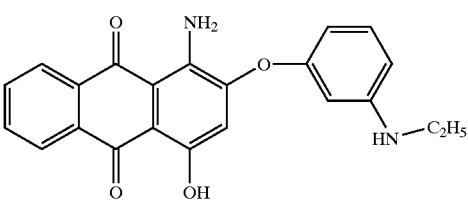 |
| 7 | 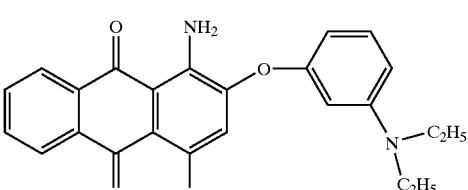 |
| 8 | 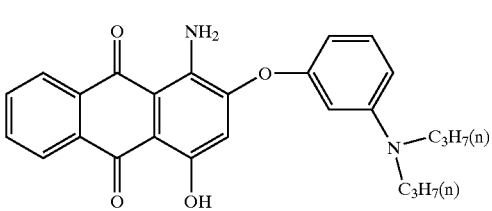 |
| 9 | 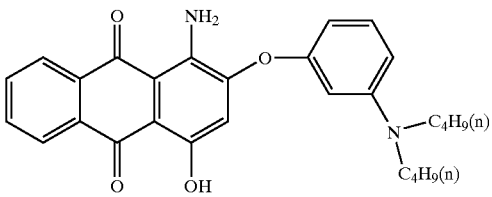 |

TABLE 1-continued

| No. | Structure formula |
|---|---|
| 10 | 1-amino-4-hydroxy-2-[3-(di-n-hexylamino)phenoxy]anthraquinone |
| 11 | 1-amino-4-hydroxy-2-[3-(di-sec-pentylamino)phenoxy]anthraquinone |
| 12 | 1-amino-4-hydroxy-2-[4-(diphenylmethyl)phenoxy]anthraquinone |
| 13 | 1-amino-4-hydroxy-7-methyl-2-[3-(diethylamino)phenoxy]anthraquinone |
| 14 | 1-amino-4-hydroxy-6-ethyl-2-[3-(di-n-butylamino)phenoxy]anthraquinone |
| 15 | 1-amino-4-hydroxy-6-ethyl-2-[3-(diethylamino)phenoxy]anthraquinone |
| 16 | 1-amino-4-hydroxy-6-methoxy-2-[3-(diethylamino)phenoxy]anthraquinone |

TABLE 1-continued

| No. | Structure formula |
|---|---|
| 17 | |
| 18 | |
| 19 | |
| 20 | |
| 21 | |
| 22 | |
| 23 | |

TABLE 1-continued

| No. | Structure formula |
|---|---|
| 24 | |
| 25 | |
| 26 | |
| 27 | |
| 28 | |
| 29 | |
| 30 | |

TABLE 1-continued

| No. | Structure formula |
|---|---|
| 31 | |
| 32 | |
| 33 | |
| 34 | |
| 35 | |
| 36 | |

TABLE 1-continued

| No. | Structure formula |
|---|---|
| 37 | *(1-amino-4-hydroxy-2-(3-trifluoromethylphenoxy)anthraquinone structure)* |
| 38 | *(1-amino-4-hydroxy-2-(4-n-nonylphenoxy)anthraquinone structure)* |
| 39 | *(1-amino-4-hydroxy-2-[4-(2-ethylhexanoyloxy)phenoxy]anthraquinone structure)* |
| 40 | *(1-amino-4-hydroxy-2-[4-(2-ethylhexyloxycarbonylmethylthio)phenoxy]anthraquinone structure)* | note)
No: Coloring matter No.

A process for producing the coloring matter represented by the formula (1), which is used in the invention, is not particularly limited. It is produced by reacting a 2-haloanthraquinone compound with an organic compound having an OH group or an $NH_2$ group, for example, a substituted phenol or thiol. More specifically, for example, it can be produced by dissolving or suspending 1-amino-2-halo-4-hydroxyanthraquinone represented by the formula (3) in an organic solvent and reacting the same with an unsubstituted or substituted phenol of the formula (4).

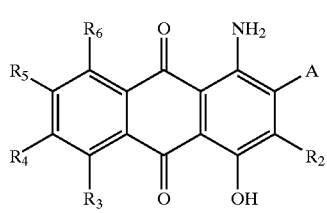
(3)

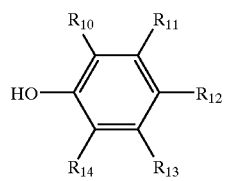
(4)

[wherein A represents a halogen atom, and $R_2$ to $R_6$ and $R_7$ to $R_{11}$ are as defined in the formulas (1) and (2).]

Examples of the 1-amino-2-halo-4-hydroxyanthraquinone compound represented by the formula (3) as used in this reaction include 1-amino-2-chloro-4-hydroxyanthraquine and 1-amino-2-bromo-4-hydroxyanthraquinone.

Further, when the phenol represented by the formula (4) as used in this reaction is a phenol having an amino group, examples thereof include N,N-dimethyl-m-aminophenol, N,N-dimethyl-p-aminophenol, N,N-diethyl-m-aminophenol, N,N-diethyl-p-aminophenol, N,N-di-n- propyl-m-aminophenol, N,N-di-n-propyl-p-aminophenol, N,N-diisopropyl-m-aminophenol, N,N-diisopropyl-p-aminophenol, N,N-di-n-butyl-m-aminophenol, N,N-di-n-butyl-p-aminophenol, N,N-diisobutyl-m-aminophenol, N,N-diisobutyl-p-aminophenol, N,N-di-sec-butyl-m-aminophenol, N,N-di-sec-butyl-p-aminophenol, N,N-di-tert-butyl-m-aminophenol, N,N-di-,tert-butyl-p-aminophenol and the like.

Examples of the organic solvent used in this reaction include polar solvents such as N,N-dimethylformamide, N,N-dimethylacetamide, 1-methyl-2-pyrrolidone, 1,3-dimethyl-2-imidazolidine, sulfolane and the like; and aromatic solvents such as toluene, xylene, nitrobenzene, picoline, quinone and the like. The amount of the solvent used is 1 to 100 parts by weight, preferably 2 to 20 parts by weight per part by weight of the 2-haloanthraquinone compound.

The amount of the aminophenol used in this invention is 0.1 to 10 mols, preferably 0.5 to 2 mols, more preferably 0.8 to 1.5 mols per mol of the 2-haloanthraquinone compound. The reaction temperature is 0 to 300° C., preferably 50 to 200° C. The reaction time is not absolutely determined by the other reaction conditions. It is 0.1 to 24 hours, preferably 0.5 to 10 hours.

Further, this reaction is accelerated in the presence of a deoxidizer, examples thereof being carbonates such as potassium hydrogencarbonate, potassium carbonate, sodium hydrogencarbonate, sodium carbonate and the like, and alkali hydroxides such as sodium hydroxide, potassium hydroxide and the like. The post treatment after the reaction is conducted by, after the reaction, distilling off the solvent or charging the reaction solution into a poor solvent to the anthraquinone compound and separating the precipitate by filtration or extracting the same.

The anthraquinone compounds (hereinafter referred to as coloring matters) represented by the formula (1) as used in the invention are useful as coloring matters for various inks, especially for an ink jet recording system. The coloring matters can be used as such. However, when they are used as coloring matters for an ink jet recording system in particular, they may be purified by, for example, desalting treatment with an ion exchange resin or through ultrafiltration, or by other desalting treatments, or by column chromatography.

The ink for ink jet recording in the invention contains the coloring matter represented by the formula (1), water and the resin as main components, and it is ink in the form of an emulsion in which the resin fine particles colored with the coloring matter represented by the formula (1) are dispersed in the emulsification step. Further, the ink for ink jet recording in the invention may contain, as required, an organic solvent, additives and the like. The coloring matters represented by the formula (1) may be used either singly or in admixture of two or more, or may be mixed with other coloring matters different in structure.

In the ink for ink jet recording in the invention, the resin constituting the colored resin fine particles can be a resin having an ionic group on the surface. For example, various resins such as a polyester resin, a vinyl polymer, a styrene resin, a styrene-acrylic copolymer, a polyurethane resin and the like can be used.

The polyester resin is made of polybasic carboxylic acids and polyhydric alcohols, and resins obtained by using the same either singly or in combination respectively are listed. The polybasic carboxylic acids are not particularly limited. Examples thereof include aromatic polybasic carboxylic acids, aromatic oxycarboxylic acids, aliphatic dicarboxylic acids, alicyclic dicarboxylic acids and the like such as terephthalic acid, isophthalic acid, o-phthalic acid, 1,5-naphthalenedicarboxylic acid, 2,6-naphthalenedicarboxylic acid, diphenic acid, sulfoterephthalic acid, 5-sulfoisophthalic acid, 4-sulfophthalic acid, 4-sulfonaphthalene-2,7-dicarboxylic acid, 5[4-sulfophenoxy]isophthalic acid, sulfoterephthalic acid, p-oxybenzoic acid, p-(hydroxyethoxy)benzoic acid, succinic acid, adipic acid, azelaic acid, sebacic acid, dodecanedicarboxylic acid, fumaric acid, maleic acid, itaconic acid, hexahydrophthalic acid, tetrahydrophthalic acid, trimellitic acid, trimesic acid, pyromellitic acid and the like. These can also be used as metal salts, ammonium salts and the like.

The polyhydric alcohols are not particularly limited. Examples thereof include aliphatic polyhydric alcohols, alicyclic polyhydric alcohols, aromatic polyhydric alcohols and the like such as ethylene glycol, propylene glycol, 1,3-propanediol, 2,3-butanedionl, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol, trimethylolethane, trimethylolpropane, glycerin, pentaerythritol, 1,4-cyclohexanediol, 1,4-cyclohexanedimethanol, spiroglycol, tricyclodecanediol, tricyclodecanedimethanol, m-xylene glycol, o-xylene glycol, 1,4-phenylene glycol, bisphenol A, lactone polyester polyols and the like. Further, with respect to the polyester resin obtained by polymerizing the polybasic carboxylic acids and the polyhydric alcohols either singly or in combination respectively, a resin obtained by capping the polar group in the end of the polymer chain using an ordinary compound capable of capping an end can also be used.

The resins such as the vinyl polymer, the styrene resin, the styrene-acrylic copolymer and the like are not particularly limited, and, for example, those obtained from polymerizable monomers listed below are mentioned.

Examples of the polymerizable monomers include vinyl aromatic hydrocarbons such as styrene, o-methylstyrene, m-methylstyrene, p-methylstyrene, α-methylstyrene, p-ethylstyrene, 2,4-dimethylstyrene, p-tert-butylstyrene, p-chlorostyrene, divinyl benzene and the like, (meth)acrylic acid esters such as methyl acrylate, ethyl acrylate, butyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl)butyl acrylate, 2-ethylhexyl acrylate, cyclohexyl acrylate, hexyl acrylate, octyl acrylate, nonyl acrylate, decyl acrylate, undecyl acrylate, dodecyl acrylate phenyl acrylate, methyl methacrylate, n-propyl methacrylate, isopropyl methacrylate, n-butyl methacrylate, isobutyl methacrylate, t-butyl methacrylate, n-pentyl methacrylate, isopentyl methacrylate, neopentyl methacrylate, 3-(methyl)butyl methacrylate, 2-ethylhexyl methacrylate, hexyl methacrylate, octyl methacrylate, nonyl methacrylate, decyl methacrylate, undecyl methacrylate, dodecyl methacrylate and the like, unsaturated carboxylic acids such as acrylic acid, methacrylic acid, itaconic acid, maleic acid and the like, (meth)acrylamide, N-substituted maleimide, maleic anhydride, (meth)acrylonitrile, vinylketone, vinyl acetate, vinylidene chloride and the like. Resins obtained by polymerizing the same singly or in combination are mentioned.

The polyurethane resin is made of isocyanates and compounds having functional groups capable of reacting with isocyanates, and resins obtained by polymerizing the same either singly or in combination respectively are mentioned.

Examples of the isocyanates include
aliphatic polyisocyanates such as ethylene diisocyanate, trimethylene diisocyanate, tetramethylene diisocyanate, hexamethylene diisocyanate, octamethylene diisocyanate, nonamethylene diisocyanate, 2,2-dimethylpentane diisocyanate, 2,2,4-trimethylhexamethylene diisocyanate, decamethylene diisocyanate, butene diisocyanate, 1,3-butadiene-1,4- diisocyanate, 2,4,4-trimethylhexamethylene diisocyanate, 1,6,11-undecatriisocyanate, 1,3,6-hexamethylene triisocyanate, 1,8-diisocyanato-4-isocyanatomethyloctane, 2,5,7-trimethyl-1,8-diisocyanato-5-isocyanatomethyloctane, bis (isocyanatoethyl) carbonate, bis(isocyanatoethyl) ether, 1,4-butylene glycol dipropyl ether-ω,ω'-diisocyanate, lysine diisocyanatomethyl ester, lysine triisocyanate, 2-isocyanatoethyl-2,6-diisocyanatoethyl-2,6-diisocyanatohe xanoate, 2-isocyanatopropyl-2,6-diisocyanatohexanoate, xylylene diisocyanate, bis (isocyanatoethyl)benzene, bis(isocyanatopropyl) benzene, α,α,α'α'-tetramethylxylylene diisocyanate, bis(isocyanatobutyl)benzene, bis(isocyanatomethyl) naphthalene, bis(isocyanatomethyl)diphenyl ether, bis (isocyanatoethyl) phthalate, mesitylene triisocyanate, 2,6-di(isocyanatomethyl)furan and the like, alicyclic polyisocyanates such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2-dimethyldicyclohexylmethane diisocyanate, bis(4-isocyanato-n-butylidene)pentaerythritol, dimer acid diisocyanate, 2-isocyanatomethyl-3-(3-isocyanatopropyl)-5-isocyanatomethylbicyclo[2.2.1] heptane, 2-isocyanatomethyl-3-(3-isocyanatopropyl)-6-isocyanatomethylbicyclo[2.2.1]heptane, 2-isocyanatomethyl-2-(3-isocyanatopropyl)-5-isocyanatomethylbicyclo[2.2.1]heptane, 2-isocyanatomethyl-2-(3-isocyanatopropyl)-6-isocyanatomethylbicyclo[2.2.1]heptane, 2-isocyanatomethyl-3-(3-isocyanatopropyl)-6-(2-isocyanatoethyl)bicyclo[2.2.1]heptane, 2-isocyanatomethyl-3-(3-isocyanatopropyl)-6-(2-isocyanatoethyl)bicyclo[2.2.1]heptane, 2-isocyanatomethyl-2-(3-isocyanatopropyl)-5-(2-isocyanatoethyl)bicyclo[2.2.1]heptane, 2-isocyanatomethyl-2-(3-isocyanatopropyl)-6-(2-isocyanatoethyl)bicyclo[2.2.1]heptane, norbornanebis (isocyanatomethyl) and the like, aromatic polyisocyanates such as phenylene diisocyanate, tolylene diisocyanate, ethylphenylene diisocyanate, isopropylenephenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4-4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyldiphenylmethane-3,5,2',4',6'-pentaisocyanate, phenylisocyanatomethyl isocyanate, phenylisocyanatoethyl-ethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethylcarbazole diisocyanate, dichlorocarbazole diisocyanate and the like, sulfur-containing aliphatic isocyanates such as thiodiethyl diisocyanate, thiopropyl diisocyanate, thiodihexyl diisocyanate, dimethylsulfone diisocyanate, dithiodimethyl diisocyanate, dithiodiethyl diisocyanate, dithiopropyl diisocyanate, dicyclohexylsulfide-4,4'-diisocyanate and the like, aromatic sulfide-type isocyanates such as diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)sulfide, 4,4'-methoxybenzene thioethylene clycol-3,3'-diisocyanate and the like, aliphatic disulfide-type isocyanates such as diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethylphenyldisulfide-5,5'-diisocyanate, 3,3'-dimethoxydiphenyldisulfide-4,4'-diisocyanate, 4,4'-dimethoxydiphenyldisulfide-3,3'-diisocyanate and the like, aromatic sulfone-type isocyanates such as diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyldiphenylsulfone-3,3'-diisocyanate, 4,4'-methoxybenzeneethylenedisulfone-3,3'-diisocyanate, 4,4'-dichlorodiphenylsulfone-3,3'-diisocyanate and the like, sulfonic acid ester-type isocyanates such as 4-methyl-3-isocyanatobenzenesulfonyl-4'-isocyanatophenyl ester, 4-methoxy-3-isocyanatobenzenesulfonyl-4'-isocyanatophenyl ester and the like, aromatic sulfonic acid amides such as 4-methyl-4'-isocyanate, dibenzenesulfonylethylenediamine-4,4'-diisocyanate, 4,4'-methoxybenzenesulfonylethylenediamine-3,3'-diisocyanate, 4-methyl-3-isocyanatobenzenesulfonylanilido-4-methyl-3'-isocyanate and the like, and sulfur-containing heterocyclic compounds such as thiophene-2,5-diisocyanate, thiophene-2,5-diisocyanatomethyl, 1,4-dithian-2,5-diisocyanate, 1,4-dithian-2,5-diisocyanatomethyl and the like.

The compounds having functional groups capable of reacting with the isocyanates are as follows.

Polyol compounds including aliphatic polyols such as ethylene glycol, diethylene glycol, triethylene glycol, tetraethylene glycol, propylene glycol, dipropylene glycol, butylene glycol, neopentyl glycol, glycerin, trimethylolethane, trimethylolpropane, butanetriol, 1,2-methyl glycoside, pentaerythritol, dipentaerythritol, tripentaerythritol, sorbitol, erythritol, threitol, ribitol, arabinitol, xylitol, allitol, mannitol, dolcitol, iditol, glycol, inositol, hexanetriol, triglycerose, diglyperol, polyethylene glycol, polypropylene glycol, polytetraethylene ether glycol, tris(2-hydroxyethyl) isocyanurate, cyclobutanediol, cyclopentanediol, cyclohexanediol, cycloheptanediol, cyclooctanediol, cyclohexanedimethanol, hydroxypropylcyclohexanol, bicyclo[4.3.0]nonanediol, dicyclohexanediol, tricyclo [5.3.1.1]dodecanediol, bicyclo[4.3.0]nonanedimethanol, tricyclo[5.3.1.1]dodecaneethanol, hydroxypropyltricyclo [5.3.1.1]dodecanol, spiro[3.4]octanediol, 1,1'-bicyclohexylidenediol, cyclohexanetriol, maltitol, lactitol and the like, aromatic polyols such as dihydroxynaphthalene, trihydroxynaphthalene, tetrehydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A-bis(2-hydroxyethyl ether), tetrabromobisphenol A, tetrabromobisphenol A-bis(2-hydroxyethyl ether), bisphenol S and the like, halogenated polyols such as dibromoneopentyl glycol and the like, polyester polyols, polycaprolactones, polythioether polyols, polyacetal polyols, polycarbonate polyols, polycaprolactone polyols, polythioether polyols, polybutadiene polyols and furan dimethanol, as well as condensation reaction products of organic acids such as oxalic acid, glutamic acid, adipic acid, acetic acid, phthalic acid, isophthalic acid, salicylic acid, pyromellitic acid and the like with the foregoing polyols, addition reaction products of the foregoing polyols with alkylene oxides such as ethylene oxide, propylene oxide and the like, addition reaction products of alkylene polyamines with alkylene oxides, 2,2-dimethylollactic acid, 2,2-dimethylolpropionic acid, 2,2-dimethylolbutanoic acid, 2,2-dimethylolvaleric acid, 3,4-diaminobutanesulfonic acid, 3,6-diamino-2-toluenesulfonic acid and caprolactone-modified products thereof, 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1,3-butanediol, pentaerythritol tris(3-mercaptopropionate), pentaerythritol mono(3-mercaptopropionate), pentaerythritol tris(thioglycolate), pentaerythritol pentakis (3-mercaptopropionate), hydroxymethyltris (mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfidemono(3-mercaptopropionate), dimercaptoethane mono(salicylate), hydroxyethylthiomethyltris(mercaptoethylthio) methane and the like.

Also available are polyamino compounds such as ethylenediamine, diethylenetriamine, triethylenetetramine, propylenediamine, butylenediamine, hexamethylenediamine, cyclohexylenediamine, piperazine, 2-methylpiperazine, phenylenediamine, tolylenediamine, xylenediamine, α,α'-methylenebis(2-chloroaniline)-3,3'-dichloro-α,α'-biphenylamine, m-xylylenediamine, isophoronediamine, N-methyl-3,3'-diaminopropylamine, norbornenediamine and the like, polythiol compounds, α-amino acids such as serine, lysine, histidine and the like, and further halogen-substituted products of these active hydrogen compounds. These may be used either singly or in admixture of two or more. These resins can be used either singly or in admixture of two or more. However, these are not critical at all.

Moreover, these resins exhibit an excellent water dispersibility by containing an ionic group on the surface thereof.

Examples of such an ionic group can include a sulfonic acid group, a carboxylic acid group, a sulfuric acid group, a phosphoric acid group, a phosphonic acid group, a phosphinic acid group, alkali metal salt groups or ammonium salt groups thereof, primary to tertiary amine groups, and the like. A carboxylic acid alkali metal salt group, a carboxylic acid ammonium salt group, a sulfonic acid alkali metal salt group and a sulfonic acid ammonium salt group are preferable. A sulfonic acid alkali metal salt group and a sulfonic acid ammonium salt group are especially preferable in view of water dispersion stability. The ionic group can be introduced by adding a monomer having an ionic group in the formation of a resin.

For example, when a carboxylic acid alkali metal salt group or a carboxylic acid ammonium salt group is introduced into a polyester resin as an ionic group, a method can be used in which a polybasic carboxylic acid such as trimellitic acid or the like is introduced into a system at a terminal stage of polymerization of a polyester to add a carboxyl group to an end of a resin and this is further converted into a carboxylic acid salt group by being neutralized with ammonia, sodium hydroxide or the like.

Further, when a sulfonic acid alkali metal salt group or a sulfonic acid ammonium salt group is introduced into polyester resin fine particles as an ionic group, these ionic groups can be introduced into a polyester resin by introducing a mono- or di-carboxylic acid having a sulfonic acid alkali metal salt group or a sulfonic acid ammonium salt group into a system. Examples of the salt include an ammonium ion, Li, Na, K, Mg, Ca, Cu, Fe and the like. K and Na are especially preferable.

The ink for ink jet recording in the invention is produced by (1) a method in which after a coloring matter for ink jet recording is dissolved or dispersed in the polymerizable monomer, emulsion polymerization is conducted, and the polymer is emulsified as a water dispersion by adding additives or the like, as required, for uniform dissolution or uniform dispersion and further adding water, (2) a method in which after polymerization is conducted to obtain the resin, a coloring matter for ink jet recording is directly added, the mixture is emulsified as a water dispersion by adding additives or the like, as required, for uniform dissolution or uniform dispersion and further adding water, (3) a method in which a substance obtained by dissolving or dispersing a coloring matter for ink jet recording in a water-soluble organic solvent (for example, acetone, methyl ethyl ketone, tetrahydfuran, dioxane or the like) or a known film-forming aid (for example, texanol, N,N-dimethylpyrrolidone or the like) is added to the resin obtained by the polymerization, the mixture is emulsified as a water dispersion by adding additives or the like, as required, for uniform dissolution or uniform dispersion and further adding water and the water-soluble organic solvent is then distilled off as required, (4) a method in which a substance obtained by dissolving or dispersing a coloring matter for ink jet recording in a water-insoluble organic solvent (for example, toluene or the like) is added to the resin obtained by the polymerization, the mixture is emulsified as a water dispersion by adding additives or the like, as required, for uniform dissolution or uniform dispersion and further adding water and the water-insoluble organic solvent is then distilled off as required, or (5) a high-temperature dyeing method in which after the aqueous dispersion of the resin is obtained, a coloring matter for ink jet recording is added to conduct high-temperature treatment.

By the way, in the production, the product is sometimes filtered with a microporous filter such as a membrane filter or the like for removing an insoluble matter.

With respect to the colored resin fine particles in the aqueous dispersion obtained by emulsification, an average particle size is preferably 0.01 to 1 μm, especially preferably 0.05 to 0.8 μm. When the average particle size is too small, there is a possibility to induce the decrease in image density or the decrease in water resistance. Further, when it is too large, there is a problem that dispersion stability in ink is decreased to form a precipitate which worsens storage stability or there is a possibility to pose a problem such as clogging of a nozzle or the like.

The content of the coloring matter in the colored resin fine particles depends on the use, the purpose, the type of the coloring matter, the composition of ink, the printing density of ink and the clogging property. It is 1 to 90% by weight, preferably 5 to 50% by weight in the resin. When the content of the coloring matter for ink is small, a large amount of ink is needed to obtain a satisfactory recorded image, exerting a load on a printing head of a recording device or a recording paper. Further, when the content of the coloring matter is large, the coloring matter tends to be precipitated from the resin particles to form a precipitate in ink, which induces clogging of a printing head or the like.

Further, in order to adjust the color tone of ink, other coloring matters or known dyes or pigments treated in the form of an emulsion or a fine dispersion may be added to the ink for ink jet recording in the invention so as not to impair ink characteristics. Still further, the amounts of the colored resin fine particles in the ink are 1 to 50% by weight, preferably 5 to 50% by weight.

In order to adjust moisture retention, surface tension, viscosity, quick-drying property and the like of ink, the ink of the invention may contain a water-soluble organic solvent as required.

Examples of the water-soluble organic solvent include polyhydric alcohols such as ethylene glycol, diethylene glycol, triethylene glycol, polyethylene glycol, propylene glycol, polypropylene glycol, 1,3-propanediol, glycerin, thioglycol and the like, polyhydric alcohol ethers such as ethylene glycol monoethyl ether, ethylene glycol monobutyl ether, diethylene glycol monobutyl ether, dipropylene glycol monoethyl ether, triethylene glycol monomethyl ether and the like, ketones such as acetone, methyl ethyl ketone and the like, amides such as N,N-dimethylformamide, N,N-diethylformamide, N,N-dimethylacetamide and the like, nitrogen-containing compounds such as 2-pyrrolidone, N-methyl-2-pyrrolidone, N-vinyl-2-pyrrolidone, 1,3-dimethyl-2-imidazolidinone and the like, ethers such as tetrahydrofuran, dioxane and the like, alcohols such as methanol, ethanol, 1-propanol, 2-propanol, 1-butanol, 2-butanol and the like, glycerin and the like. In case of containing these water-soluble organic solvents, the content thereof is preferably 1 to 30% by weight based on the total amount of the ink.

Moreover, in order to improve storage stability of the ink, it is advisable that the pH of the ink is adjusted to between 7 and 10. Examples of a pH adjustor include $NaHCO_3$, $Na_2B_4O_7$, alkanolamines such as ethanolamine, diethanolamine and triethanolamine, alkali metal hydroxides such as potassium hydroxide and lithium hydroxide, and the like.

Still further, various additives used so far can be added to the ink of the invention as required. Examples thereof include an ultraviolet absorber, an antioxidant, a dispersing agent, a dispersion stabilizer, a chelating agent, a water-soluble polymer, a masking agent, a rust-proofing agent, a preservative, a viscosity modifier, a surfactant, a surface tension modifier, a pH adjustor, a specific resistance modifier, a near infrared absorber, a penetrant and the like.

The ink of the invention which is made of the foregoing components can be used as ink for an ink jet recording system as well as ink for writing implements or the like, and it is excellent in recording characteristics, storage stability, fixability onto a recording medium, sharpness of a recorded image, light fastness, water resistance and the like.

Furthermore, the coloring matter used in the invention can also be used, due to high solubility in an organic solvent, as solvent-type ink for ink jet used in textile printing, printing or the like.

EXAMPLES

The invention is illustrated more specifically by referring to Examples. However, the invention is not limited to the following Examples. Incidentally, "part or parts" in Examples indicate "part or parts by weight".

Example 1

Synthesis Example of an Anthraquinone Compound (Coloring Matter No. 1)

One part of 1-amino-2-chloro-4-hydroxyanthraquinone, 10 parts of 1,3-dimethyl-2-imidazolidinone, 1.0 part of potassium carbonate and 2.0 parts of N,N-di-n-octyl-m-aminophenol were mixed at room temperature, and then heated to 150° C. While this temperature was maintained, the reaction was conducted for 5 hours. The reaction mixture was cooled, then charged into 100 parts of water, extracted with toluene and thereafter purified through silica gel column chromatography to obtain an anthraquinone compound as coloring matter No. 1 (yield 90%).

|  | C % | H % | N % |
|---|---|---|---|
| Elemental analysis |  |  |  |
| calculated: | 75.76 | 8.12 | 4.91 |
| found: | 75.62 | 8.15 | 4.89 |
| Mass spectrum |  |  |  |
| calculated: 570 |  | found: 570 |  |

A maximum absorption wavelength (λmax) in a toluene solution of coloring matter No. 1 was 518 nm, and a gram absorption coefficient (εg) was 28,300 ml/g·cm. Further, the compound had high solvent solubility, and exhibited solubility of 40% or more in toluene at room temperature.

Production Example of Dispersion (A) of Colored Resin Fine Particles

An autoclave fitted with a thermometer and a stirrer was charged with 180 parts of dimethyl terephthalate, 10 parts of 5-sodiumsulfoisophthalic acid dimethyl ester, 130 parts of ethylene glycol, 25 parts of tricyclodecanedimethanol and 0.1 part of tetrabutoxytitanate, and the mixture was heated at 180 to 220° C. for approximately 3 hours to conduct an ester interchange reaction. Subsequently, the reaction mixture was heated to 240° C., the pressure inside the autoclave was then slowly decreased to 10 mmHg, and the reaction was continued for 1 hour. The pressure inside the autoclave was returned to atmospheric pressure to obtain a copolyester resin. Thereafter, 100 parts of the resulting polyester resin, 150 parts of methyl ethyl ketone, 150 parts of tetrahydrofuran and 10 parts of the anthraquinone compound as coloring matter No. 1 were mixed, and 600 parts of water was then added. These were further mixed. This mixture was filtered through a 0.8-micron membrane filter, and the solvent was distilled off by heating. After cooling, the solid content was adjusted to 20% by weight by adding water to obtain dispersion (A) of colored resin fine particles. The resin fine particles dispersed in the dispersion was magenta-colored resin fine particles having an average particle diameter of 0.2 μm.

Evaluation of Characteristics

Glycerin and water were added to the dispersion (A) of colored resin fine particles to obtain aqueous ink having a solid content of 15% by weight. This aqueous ink was used, and filled in an ink cartridge for a piezo-type ink jet printer, and printing and image recording were conducted with the same printer. The test was conducted on the following items. The results are shown in Table-2.

Incidentally, the evaluation standards of the respective test items are as follows.

(A) Evaluation of Emulsification

The emulsification condition in the production of emulsion ink was visually observed, and evaluated.

Evaluation Standard

| | |
|---|---|
| Emulsification is good. | ⊚ |
| A floating matter is slightly observed, though to a negligible level in actual use. | ○ |
| Gelation is slightly observed to such a level as to possibly cause a trouble. | Δ |
| Problematic as ink due to poor emulsification | X |

(B) Evaluation of an Image

An image was formed on a plain paper, and a blotting condition was visually observed, and evaluated.

Evaluation Standard

| | |
|---|---|
| Blotting is not observed. | ⊚ |
| Blotting is observed without any influence on an image. | ○ |
| Blotting is notably observed | X |

(C) Evaluation of Image Recording Density

With respect to a plain paper having a recorded image thereon, recording density (OD value) was measured using a reflection densitometer (manufactured by Macbeth) to evaluate image recording density.

Evaluation Standard

| | |
|---|---|
| OD value is 1.1 or more. | ⊚ |
| OD value is 1.0 to less than 1.1. | ○ |
| OD value is 0.8 to less than 1.0. | Δ |
| OD value is less than 0.8. | X |

(D) Evaluation of Water Resistance

With respect to a printed portion of a plain paper having a recorded image thereon for test, printing density (OD value) was measured with a reflection densitometer before dipping in water and after dipping in water and air-drying. Water resistance was evaluated upon comparing $OD_1$.

$OD_1$=(*OD* value after dipping in water and air-drying)/(*OD* value before dipping in water)×100[%]

Evaluation Standard

| | |
|---|---|
| OD value is 90 to 100%. | ⊚⊚ |
| OD value is 80 to less than 90%. | ⊚ |
| OD value is 70 to less than 80%. | ○ |
| OD value is 50 to less than 70%. | Δ |
| OD value is less than 50%. | X |

(E) Evaluation of Light Fastness

Printing density (OD value) was measured using a xenon fadeometer (manufactured by Suga Shikenki) before irradiation and after 100 hours of irradiation. Light fastness was evaluated upon comparing $OD_2$.

$OD_2$=(*OD* value after irradiation)/(*OD* value before irradiation)×100[%]

Evaluation Standard

| | |
|---|---|
| OD value is 90 to 100%. | ⊚⊚ |
| OD value is 80 to less than 90%. | ⊚ |
| OD value is 70 to less than 80%. | ○ |
| OD value is 50 to less than 70%. | Δ |
| OD value is less than 50%. | X |

(F) Evaluation of Storage Stability of Ink

In order to evaluate initial storage stability (storage at 40° C. for 1 month) of aqueous ink and further long-term storage stability (storage at 40° C. for 3 months) thereof, a condition of aqueous ink after each storage was visually observed. Continuous recording was conducted with the foregoing printer for a long period of time, and clogging was observed.

(F-1) Condition of Ink After Storage

Evaluation Standard

| | |
|---|---|
| No problem without any precipitate or any floating matter. | ○ |
| A floating matter is slightly observed. | Δ |
| Problematic with a precipitate and a floating matter observed. | X |

(F-2) Clogging

Evaluation Standard

| | |
|---|---|
| Normal | ○ |
| Negligible level at the present stage | Δ |
| Abnormal | X |

Example 2

An autoclave fitted with a thermometer and a stirrer was charged with 150 parts of dimethyl terephthalate, 50 parts of dimethyl isophthalate, 5 parts of 5 sodium sulfoisophthalic acid dimethyl ester, 150 parts of ethylene glycol, 250 parts of neopentyl glycol and 0.1 part of tetrabutoxytitanate, and the mixture was heated at 180 to 220° C. for approximately 3 hours to conduct an ester interchange reaction. Subsequently, the reaction mixture was heated to 240° C., and the pressure inside the autoclave was then slowly decreased to 10 mmHg to continue the reaction for 1 hour. The pressure inside the autoclave was returned to atmospheric pressure to obtain a copolyester resin.

Thereafter, 100 parts of the resulting polyester resin, 150 parts of methyl ethyl ketone, 150 parts of tetrahydrofuran and 10 parts of the anthraquinone compound used in Example 1 as coloring matter No. 1 were mixed, and 600 parts of water was then added. These were further mixed. This mixture was filtered through a 0.8-micron membrane filter, and the solvent was distilled off by heating. After cooling, the solid content was adjusted to 20% by weight by adding water to obtain dispersion B of colored resin fine particles. The resin fine particles dispersed in the dispersion was magenta-colored resin fine particles having an average particle diameter of 0.3 μm.

Glycerin and water were added to the dispersion of colored resin fine particles to obtain aqueous ink having a solid content of 15% by weight. Characteristics of ink were evaluated in the same manner as in Example 1, and the results are shown in Table-2.

Examples 3 to 16

Inks were produced by the process of Example 1 or 2 using the coloring matters shown in Table 1, and the characteristics of the inks were evaluated. The results are shown in Table-2. Incidentally, "Ink production process" in Table-2 refers to either of the processes of Examples 1 and 2.

Example 17

One part by weight of 1-amino-2-chloro-4-hydroxyanthraquinone, 10 parts by weight of 1,3-dimethyl-2-imidazolidinone, 1.0 part by weight of potassium carbonate and 1.0 part by weight of N,N-di-n-butyl-m-aminophenol were mixed at room temperature, and then heated to 140° C. While this temperature was maintained, the reaction was conducted for 3 hours. The reaction mixture was then cooled to room temperature, charged into 90 parts by weight of water, and extracted with toluene. After the solution was separated, toluene was distilled off under reduced pressure, and the residue was purified through silica gel column chromatography to obtain an anthraquinone compound as coloring matter No. 9 (yield 90%) in Table 1.

|  | C % | H % | N % |
|---|---|---|---|
| Elemental analysis |  |  |  |
| calculated: | 73.34 | 6.59 | 6.11 |
| found: | 73.29 | 6.63 | 6.15 |
| Mass spectrum |  |  |  |
| calculated: 458 |  | found: 458 |  |

A maximum absorption wavelength ($\lambda$max) in a toluene solution of coloring matter No. 9 was 517 nm, and a gram absorption coefficient ($\varepsilon$g) was 30,200 ml/g·cm. Further, the compound had high solvent solubility, and exhibited solubility of 40% or more in toluene at room temperature.

Ink was produced by the process of Example 1 using coloring matter No. 9, and characteristics of the ink were evaluated. The results are shown in Table 2.

Examples 18 to 58

Inks were produced by the process of Example 1 or 2 using the coloring matters for ink jet recording shown in Table 1, and characteristics of the inks were evaluated. The results are shown in Table 2. Incidentally, "Ink production process" in Table-2 refers to either of the processes of Examples 1 and 2.

All of the aqueous inks using the coloring matters for ink jet recording in the invention were excellent in water resistance in particular, and excellent in long-term storage stability Further, they were also good in the recorded image without blotting, and were also excellent in light fastness.

Comparative Example 1

Ink was produced as in Example 1 except that an anthraquinone compound represented by formula (5) was used as a coloring matter. Consequently, since solubility of the coloring matter was low, emulsification was difficult. The ink was passed through a filter to remove an insoluble matter, and evaluation of characteristics was then conducted in the same manner. The results are shown in Table 2. Especially, in the evaluation of emulsification, poor emulsification occurred. Thus, the coloring matter was extremely bad in comparison with the coloring matters for ink jet recording in the invention.

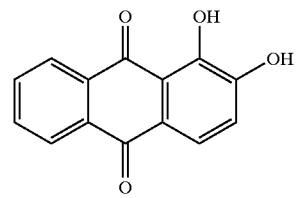

(5)

Comparative Example 2

Ink was produced as in Example 1 except that an anthraquinone compound represented by formula (6) was used as a coloring matter. Consequently, since solubility of the coloring matter was low, an insoluble matter was partially observed. The ink was passed through a filter to remove an insoluble matter, and evaluation of characteristics was then conducted in the same manner. The results are shown in Table 2. Especially, in the evaluation of image recording density and the evaluation of light fastness, the coloring matter was extremely bad in comparison with the coloring matters for ink jet recording in the invention.

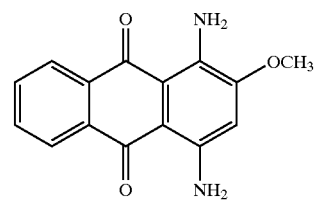

(6)

Comparative Example 3

Ink was produced as in Example 1 except that an anthraquinone compound represented by formula (7) was used as a coloring matter. Consequently, since solubility of the coloring matter was low, an insoluble matter was partially observed. The ink was passed through a filter to remove an insoluble matter, and evaluation of characteristics was then conducted in the same manner. The results are shown in the 2nd Table. Especially, in the evaluation of image recording density and the evaluation of light fastness, the coloring matter was extremely bad in comparison with the coloring matters for ink jet recording in the invention.

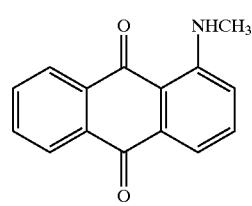

(7)

TABLE 2

| Example | Coloring matter No. | Ink production process | A | B | C | D | E | F-1 (after one month) | F-1 (after three months) | F-2 (after one month) | F-2 (after three months) |
|---|---|---|---|---|---|---|---|---|---|---|---|
| 1 | 1 | Example 1 | ◎ | ◎ | ◎ | ◎◎ | ◎◎ | ○ | ○ | ○ | ○ |
| 2 | 1 | Example 2 | ◎ | ◎ | ◎ | ◎◎ | ◎◎ | ○ | ○ | ○ | ○ |
| 3 | 2 | Example 1 | ◎ | ◎ | ◎ | ◎ | ◎ | ○ | ○ | ○ | △ |
| 4 | 2 | Example 2 | ◎ | ◎ | ◎ | ◎ | ◎ | ○ | △ | ○ | △ |
| 5 | 3 | Example 1 | ◎ | ◎ | ◎ | ◎ | ○ | ○ | X | ○ | X |
| 6 | 3 | Example 2 | ◎ | ◎ | ◎ | ○ | ○ | ○ | X | ○ | X |
| 7 | 4 | Example 1 | ◎ | ◎ | ◎ | ◎ | ○ | ○ | X | ○ | X |
| 8 | 4 | Example 2 | ◎ | ◎ | ◎ | ◎ | ○ | ○ | X | ○ | X |
| 9 | 5 | Example 1 | ◎ | ◎ | ◎ | ◎◎ | ◎ | ○ | △ | ○ | △ |
| 10 | 5 | Example 2 | ◎ | ◎ | ◎ | ◎◎ | ◎ | ○ | △ | ○ | X |
| 11 | 6 | Example 1 | ◎ | ◎ | ◎ | ◎◎ | ◎ | ○ | △ | ○ | △ |
| 12 | 6 | Example 2 | ◎ | ◎ | ◎ | ◎◎ | ○ | ○ | △ | ○ | △ |
| 13 | 7 | Example 1 | ◎ | ◎ | ◎ | ◎◎ | ◎ | ○ | △ | ○ | △ |
| 14 | 7 | Example 2 | ◎ | ◎ | ◎ | ◎◎ | ◎ | ○ | △ | ○ | △ |
| 15 | 8 | Example 1 | ◎ | ◎ | ◎ | ◎◎ | ◎◎ | ○ | ○ | ○ | △ |
| 16 | 8 | Example 2 | ◎ | ◎ | ◎ | ◎◎ | ◎◎ | ○ | △ | ○ | △ |
| 17 | 9 | Example 1 | ◎ | ◎ | ◎ | ◎◎ | ◎◎ | ○ | ○ | ○ | ○ |
| 18 | 9 | Example 2 | ◎ | ◎ | ◎ | ◎◎ | ◎◎ | ○ | ○ | ○ | ○ |
| 19 | 10 | Example 1 | ◎ | ◎ | ◎ | ◎◎ | ◎◎ | ○ | ○ | ○ | ○ |
| 20 | 10 | Example 2 | ◎ | ◎ | ◎ | ◎◎ | ◎◎ | ○ | ○ | ○ | ○ |
| 21 | 11 | Example 1 | ◎ | ◎ | ◎ | ◎◎ | ◎◎ | ○ | ○ | ○ | ○ |
| 22 | 11 | Example 2 | ◎ | ◎ | ◎ | ◎◎ | ◎◎ | ○ | ○ | ○ | ○ |
| 23 | 12 | Example 1 | ◎ | ◎ | ◎ | ◎ | ○ | ○ | △ | ○ | △ |
| 24 | 12 | Example 2 | ◎ | ◎ | ◎ | ◎ | ○ | ○ | △ | ○ | △ |
| 25 | 13 | Example 1 | ◎ | ◎ | ◎ | ◎◎ | ◎◎ | ○ | △ | ○ | △ |
| 26 | 13 | Example 2 | ◎ | ◎ | ◎ | ◎◎ | ◎◎ | ○ | ○ | ○ | △ |
| 27 | 14 | Example 1 | ◎ | ◎ | ◎ | ◎◎ | ◎◎ | ○ | ○ | ○ | ○ |
| 28 | 14 | Example 2 | ◎ | ◎ | ◎ | ◎◎ | ◎◎ | ○ | ○ | ○ | ○ |
| 29 | 15 | Example 1 | ◎ | ◎ | ◎ | ◎◎ | ◎ | ○ | ○ | ○ | △ |
| 30 | 15 | Example 2 | ◎ | ◎ | ◎ | ◎◎ | ◎ | ○ | △ | ○ | △ |
| 31 | 16 | Example 1 | ◎ | ◎ | ◎ | ◎ | ◎ | ○ | △ | ○ | X |
| 32 | 16 | Example 2 | ◎ | ◎ | ◎ | ◎ | ◎ | ○ | △ | ○ | △ |
| 33 | 17 | Example 1 | ◎ | ◎ | ◎ | ◎◎ | ◎◎ | ○ | ○ | ○ | ○ |
| 34 | 17 | Example 2 | ◎ | ◎ | ◎ | ◎◎ | ◎◎ | ○ | ○ | ○ | ○ |
| 35 | 18 | Example 1 | ◎ | ◎ | ◎ | ◎◎ | ◎◎ | ○ | ○ | ○ | ○ |
| 36 | 18 | Example 2 | ◎ | ◎ | ◎ | ◎◎ | ◎◎ | ○ | ○ | ○ | ○ |
| 37 | 19 | Example 1 | ○ | ○ | ○ | ○ | △ | △ | X | △ | X |
| 38 | 20 | ↑ | ○ | ○ | △ | ○ | △ | △ | X | △ | X |
| 39 | 21 | ↑ | ○ | ○ | △ | ○ | △ | △ | X | △ | X |
| 40 | 22 | ↑ | ○ | ○ | △ | ○ | △ | △ | X | △ | X |
| 41 | 23 | ↑ | ○ | ○ | ○ | ○ | △ | △ | X | △ | X |
| 42 | 24 | ↑ | ○ | ○ | ○ | ○ | ○ | △ | X | △ | X |
| 43 | 25 | ↑ | ○ | ○ | ○ | ○ | ○ | △ | X | △ | X |
| 44 | 26 | ↑ | ○ | ○ | ○ | ○ | ○ | △ | X | △ | X |
| 45 | 27 | ↑ | ○ | ○ | △ | ○ | △ | △ | X | △ | X |
| 46 | 28 | ↑ | ○ | ○ | ○ | ○ | ○ | △ | X | △ | X |
| 47 | 29 | ↑ | ○ | ○ | △ | ○ | △ | △ | X | △ | X |
| 48 | 30 | ↑ | ○ | ○ | △ | ○ | △ | △ | X | △ | X |
| 49 | 31 | ↑ | ○ | ○ | △ | ○ | △ | △ | X | △ | X |
| 50 | 32 | ↑ | ○ | ○ | △ | ○ | △ | △ | X | △ | X |
| 51 | 33 | ↑ | ◎ | ◎ | ◎ | ○ | ○ | ○ | X | ○ | X |
| 52 | 34 | ↑ | ◎ | ◎ | ◎ | ○ | ○ | ○ | X | ○ | X |
| 53 | 35 | ↑ | ◎ | ◎ | ◎ | ○ | ○ | ○ | X | △ | X |
| 54 | 36 | ↑ | ◎ | ◎ | ○ | ○ | ○ | △ | X | △ | X |
| 55 | 37 | ↑ | ○ | ○ | ○ | ○ | ○ | △ | X | △ | X |
| 56 | 38 | ↑ | ○ | ○ | ○ | ○ | ○ | △ | X | △ | X |
| 57 | 39 | Example 1 | ○ | ○ | ○ | ○ | ○ | △ | X | △ | X |
| 58 | 40 | ↑ | ○ | ○ | ○ | ○ | ○ | △ | X | △ | X |
| Comparative Example 1 | — | ↑ | X | X | X | X | X | X | X | X | X |
| Comparative Example 2 | — | ↑ | △ | △ | X | △ | X | X | X | X | X |
| Comparative Example 3 | — | ↑ | △ | △ | X | ○ | X | X | X | X | X |

INDUSTRIAL APPRICABILITY

The magenta coloring matters according to the invention are especially excellent in water resistance in particular, and further excellent in light fastness and compatibility with a resin. Thus, they are suitable for use in aqueous ink for ink jet recording. Further, the aqueous ink for ink jet recording obtained by using these coloring matters exhibits excellent performances in light fastness and storage stability. Especially when it is used as aqueous ink for an ink jet recording system, a high-quality, unblotted image can be formed using an ink composition which contains at least a water-insoluble magenta coloring matter, water and a resin as main components to form an emulsion. Further, a recorded image has also excellent property in water resistance.

That is, the invention can provide the aqueous ink for ink jet recording that gives the high-quality image, the magenta coloring matter excellent in light fastness and storage stability which is used therein, the resin fine particles using this coloring matter, and the dispersion obtained by dispersing the fine particles in water.

What is claimed is:

1. An aqueous ink for ink jet recording comprising water and a resin as an emulsion, wherein the resin is colored with a water-insoluble coloring matter selected from the group consisting of anthraquinone compounds of the following formula (1)

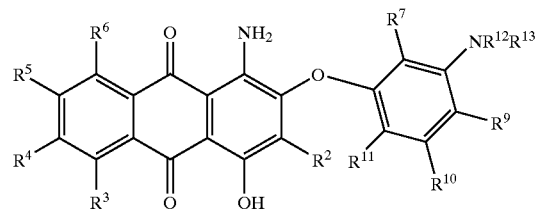

wherein:
$R^2$, $R^3$, $R^4$, $R^5$, and $R^6$ are each independently selected from the group consisting of hydrogen, optionally substituted alkyl, and optionally substituted alkoxy:
$R^7$, $R^9$, $R^{10}$, and $R^{11}$ are each independently selected from the group consisting of hydrogen, optionally substituted alkyl, and acyl; and
$R^{12}$ and $R^{13}$ are each independently alkyl of 3 or more carbons.

2. The aqueous ink of claim 1, wherein $R^{12}$ and $R^{13}$ are each independently alkyl of 4 or more carbons.

3. The aqueous ink of claim 1, wherein the water-insoluble coloring matter is present in an amount of 5 to 50% by weight of the resin.

4. The aqueous ink of claim 1, wherein the resin is present in an amount of 5 to 50% by weight of the aqueous ink.

* * * * *